United States Patent
Ohara et al.

(10) Patent No.: US 10,473,855 B2
(45) Date of Patent: Nov. 12, 2019

(54) RESIN OPTICAL WAVEGUIDE

(71) Applicant: AGC INC., Chiyoda-ku (JP)

(72) Inventors: Seiki Ohara, Tokyo (JP); Kenta Kobayashi, Tokyo (JP); Shotaro Takenobu, Tokyo (JP)

(73) Assignee: AGC INC., Chiyoda-ku (JP)

( * ) Notice: Subject to any disclaimer, the term of this patent is extended or adjusted under 35 U.S.C. 154(b) by 0 days.

(21) Appl. No.: 16/203,983

(22) Filed: Nov. 29, 2018

(65) Prior Publication Data

US 2019/0107674 A1  Apr. 11, 2019

Related U.S. Application Data

(63) Continuation of application No. PCT/JP2017/020131, filed on May 30, 2017.

(30) Foreign Application Priority Data

Jun. 2, 2016 (JP) .................. 2016-110903

(51) Int. Cl.
*G02B 6/122* (2006.01)
*G02B 6/12* (2006.01)

(52) U.S. Cl.
CPC ............. *G02B 6/1228* (2013.01); *G02B 6/12* (2013.01); *G02B 6/122* (2013.01); *G02B 2006/12069* (2013.01)

(58) Field of Classification Search
None
See application file for complete search history.

(56) References Cited

U.S. PATENT DOCUMENTS 8,724,937 B2   5/2014   Barwicz et al.
2001/0043783 A1*  11/2001  Sotokawa ............. G02B 1/046
                                                385/131
(Continued)

FOREIGN PATENT DOCUMENTS

JP    5-323139        12/1993
JP    2011-221195     11/2011
(Continued)

OTHER PUBLICATIONS

International Search Report dated Aug. 29, 2017 in PCT/JP2017/020131, filed on May 30, 2017 (with English Translation).
(Continued)

*Primary Examiner* — Chad H Smith
(74) *Attorney, Agent, or Firm* — Oblon, McClelland, Maier & Neustadt, L.L.P.

(57) ABSTRACT

Provided is a resin optical waveguide containing a core, under cladding and over cladding, in which the resin optical waveguide has portions having a core width varying along a light propagation direction, the maximum core width is 4 to 10 μm, and the minimum core width of 1 μm or more and less than 4 μm, when the length of a portion S at which the core width is 1 μm or more and less than 4 μm is LS and the length of a portion at which the core width is 4 to 10 μm is LL, the proportion of LS to the total length is 0.1 to 40%, and the portion S contains neither a certain bubble defect nor a certain defect inside the core and in a vicinity of a core-cladding interface.

12 Claims, 3 Drawing Sheets

(56) References Cited

U.S. PATENT DOCUMENTS

| | | | |
|---|---|---|---|
| 2004/0067023 A1* | 4/2004 | Hanashima | G02B 6/12007 385/43 |
| 2006/0029348 A1 | 2/2006 | Kempen et al. | |
| 2014/0112616 A1 | 4/2014 | Numata | |

FOREIGN PATENT DOCUMENTS

| | | |
|---|---|---|
| JP | 2012-63620 | 3/2012 |
| JP | 2012-225952 | 11/2012 |
| JP | 2013-120338 | 6/2013 |
| JP | 2014-81586 | 5/2014 |
| WO | WO 2010/107005 A1 | 9/2010 |

OTHER PUBLICATIONS

Written Opinion dated Aug. 29, 2017 in PCT/JP2017/020131, filed on May 30, 2017.

Shu, J., et al. "Efficient coupler between chip-level and board-level optical waveguides", Optics Letters, vol. 36, No. 18, 2011, 3 pages.

* cited by examiner

[FIG. 1]
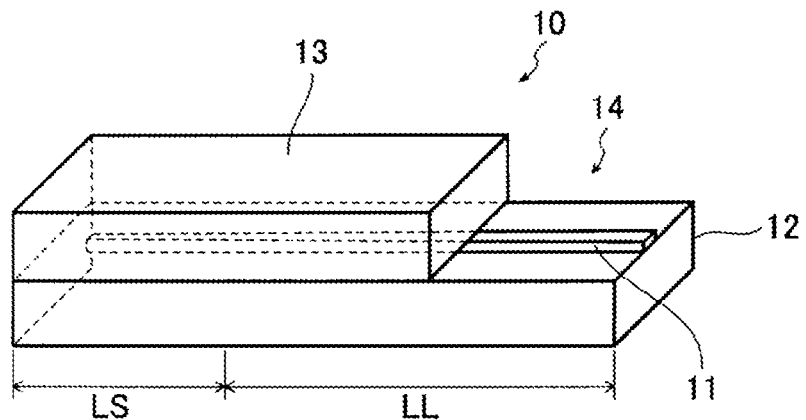
[FIG. 2]
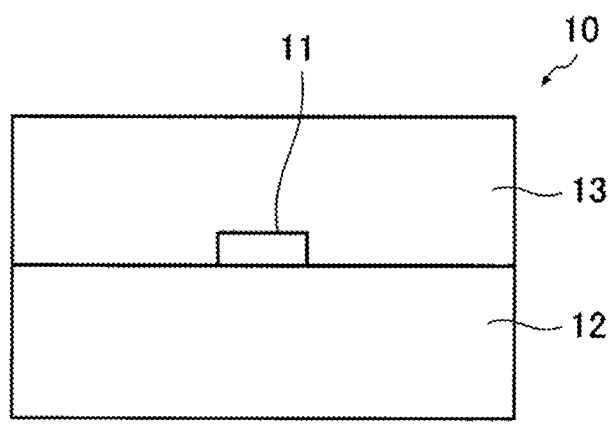
[FIG. 3]
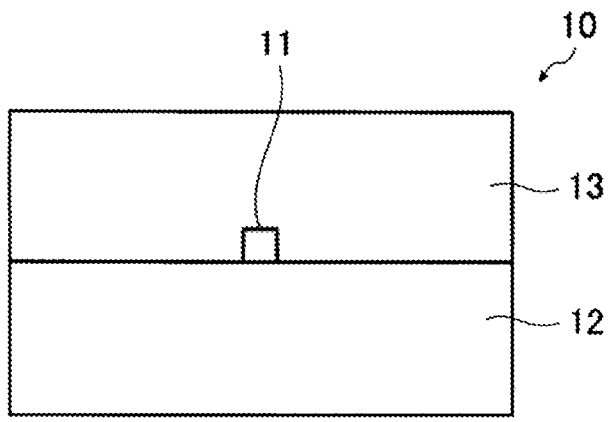

[FIG. 4]
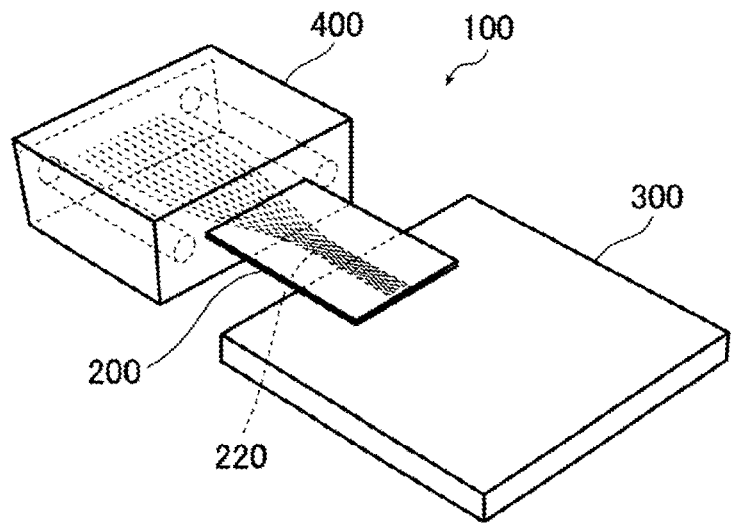
[FIG. 5]
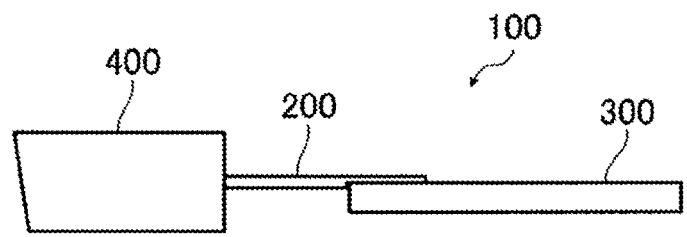
[FIG. 6]
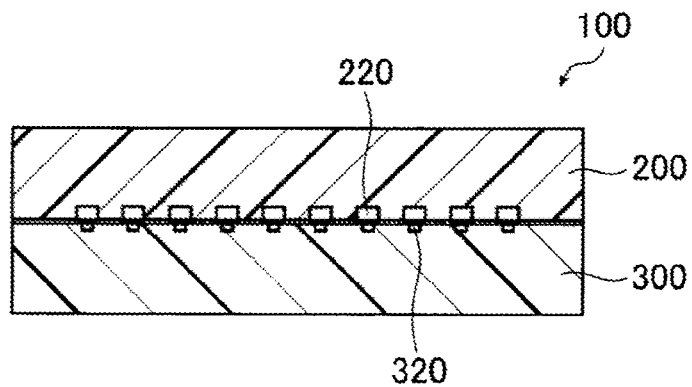

[FIG. 7]
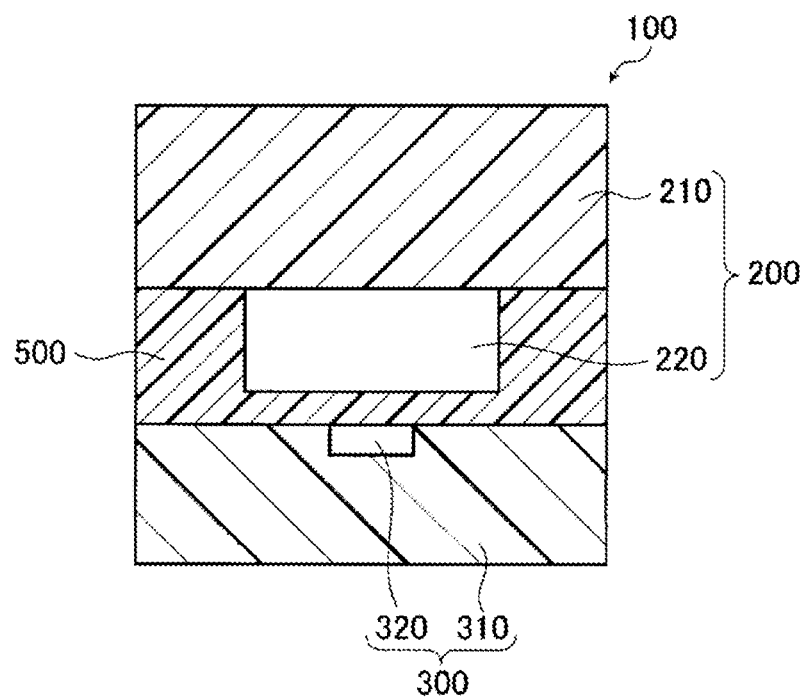
[FIG. 8]
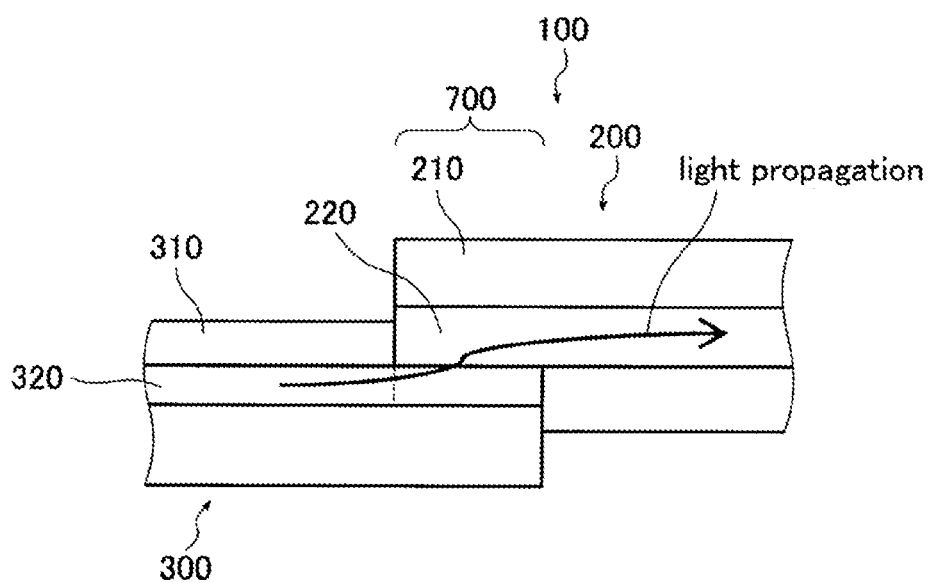

RESIN OPTICAL WAVEGUIDE

TECHNICAL FIELD

The present invention relates to a resin optical waveguide.

BACKGROUND ART

Resin optical waveguides of a multi-mode and a single-mode, which are formed on a printed board and thus rigid or formed on a polymer-made film and thus flexible, have been widely used. The principle of the resin optical waveguide is that a core and clad(s) that are a combination of a plurality of resins having different refractive indices are combined and the core is used as an optical waveguide.

On the other hand, silicon optical waveguides obtained by forming an optical waveguide on a silicon chip have been also widely used (see PTL 1).

Any of the resin optical waveguide and the silicon optical waveguide is formed to have an array shape in a form in which a plurality of waveguides is aligned in parallel in one direction, in order to obtain a plurality of waveguide channels.

Attempts to propagate light between the resin optical waveguide and the silicon optical waveguide have been made. However, in order to realize coupling for efficiently propagating light at a micro level, positioning with high accuracy is required.

In the case of a multi-mode optical waveguide, in coupling between optical waveguides or between an optical waveguide and a multi-mode optical fiber, the size of a core cross-section is large, and the sizes of the core cross-sections or the numbers of openings are substantially equal to each other. Thus, it can be realized at an allowable level of loss so long as positioning accuracy of butting cross-sections with each other is assured in the cross-sections being in contact with each other.

In practice, it has been realized by so-called butt coupling.

However, in coupling between a single-mode resin optical waveguide and a silicon optical waveguide, core cross-sections of each are considerably small, and the sizes of the core cross-section or the numbers of openings are largely different from each other. Thus, performing the butt coupling is difficult.

From this viewpoint, an adiabatic coupling, in which light seeping out in an optical axis direction along the array (also referred to as evanescent light below) is captured and caused to communicate over a predetermined distance in the optical axis direction, has attracted attentions as an alternative method (see PTLs 1 and 2).

FIG. 4 is a perspective view illustrating a configuration example of a composite optical waveguide in which a resin optical waveguide and a silicon optical waveguide are adiabatically coupled. FIG. 5 is a side view illustrating the composite optical waveguide 100 in FIG. 4. FIG. 6 is a transverse sectional view at an adiabatic coupling portion of the composite optical waveguide 100 in FIG. 4. FIG. 7 is a partial enlarged view of FIG. 6. FIG. 8 is a partial longitudinal sectional view of the adiabatic coupling portion of the composite optical waveguide 100 in FIG. 4.

In the composite optical waveguide 100 illustrated in the drawings, a resin optical waveguide 200 and a silicon optical waveguide 300 are adiabatically coupled. The other end side of the resin optical waveguide 200 in the composite optical waveguide 100, which is opposite to the adiabatic coupling portion, is accommodated in a connector 400 for coupling with a single-mode optical fiber or the like. The resin optical waveguide 200 is configured of a core 220 and a cladding 210. The silicon optical waveguide 300 is configured of a core 310 and a cladding 310. They are adhered to each other by an adhesive layer 500. In the resin optical waveguide 200 and the silicon optical waveguide 300, light propagates in the cores 220 and 320.

As described above, in the adiabatic coupling, evanescent light is captured and caused to communicate over the predetermined distance in the optical axis direction. Therefore, the core 220 in the resin optical waveguide 200 and the core 320 in the silicon optical waveguide 300 are disposed to face each other at the adiabatic coupling portion, as illustrated in FIG. 6. However, in the resin optical waveguide 200, the cladding is not provided on a side facing the core 320 of the silicon optical waveguide 300, and thus the core 220 is exposed.

FIG. 7 is a partial enlarged view of FIG. 6 and illustrates a one-to-one positional relationship between the core 220 of the resin optical waveguide 200 and the core 320 of the silicon optical waveguide 300 at the adiabatic coupling portion. In the resin optical waveguide 200 and the silicon optical waveguide 300 illustrated in FIG. 7, portions other than the cores 220 and 320 serve as the dads 210 and 310, respectively.

As illustrated in FIG. 7, at the adiabatic coupling portion, the core 220 in the resin optical waveguide 200 and the core 320 in the silicon optical waveguide 300 are disposed in a state of facing each other and bonded to each other by using the adhesive layer 500 of an epoxy resin or the like.

FIG. 8 is a partial longitudinal sectional view of the adiabatic coupling portion of the composite optical waveguide 100 in FIG. 4, and illustrates a form of light propagation of evanescent light at an adiabatic coupling portion 700.

CITATION LIST

Patent Literature

[PTL 1] JP-A2014-81586
[PTL 2] U.S. Pat. No. 8,724,937

NON PATENT LITERATURE

[NPL 1] Efficient coupler between chip-level and board-level optical waveguides, Jie Shu, Ciyuan Qiu, Xuezhi Zhang, and Qianfan Xu, OPTICS LETTERS/Vol. 36. No. 18/Sep. 15, 2011

SUMMARY OF INVENTION

Technical Problem

It is necessary to pay attention to points as will be described below regarding a resin optical waveguide performing adiabatic coupling to a silicon optical waveguide.

At the adiabatic coupling portion at which evanescent light communicates between the silicon optical waveguide and the resin optical waveguide, the cladding is not provided on the side of that portion of the resin optical waveguide, and thus the core is exposed. That is, a core-exposed portion is provided on one end side of the resin optical waveguide, which acts as the adiabatic coupling portion. Regarding the core formed at the core-exposed portion, without reducing a core height to a certain level, spreading in a propagation mode does not occur largely and it becomes difficult to make light propagate in the silicon optical waveguide. Therefore, about 4 μm is set as an upper limit of the core height.

On the other hand, as illustrated in FIG. 3 in NPL 1, from a viewpoint of a tolerance for axial deviation between the silicon optical waveguide and the resin optical waveguide, the core formed at the core-exposed portion preferably has a large core width. Therefore, on one end side of the resin optical waveguide at which the core-exposed portion is provided, the core preferably has a cross-sectional shape of a rectangle in which the core width is longer than the core height.

On the other hand, in the case where the other end side of the resin optical waveguide 200, which is accommodated in the connector 400, is connected to a single-mode optical fiber, the cross-sectional shape of the core 220 is preferably a substantially square in which the core height and the core width are substantially equal to each other. The butt coupling with a single-mode fiber can be achieved at low loss due to the substantially-equal substantially-square shape.

Thus, in the resin optical waveguide, it is preferable that the cross-sectional shape of the core differs between one end side at which adiabatic coupling is performed with a silicon optical waveguide and the other end side connected to a single-mode optical fiber. Regarding configurations in which the cross-sectional shape of the core of the resin optical waveguide differs between one end side and the other end side, the following three modes can be considered.

(1) The core height differs between one end side and the other end side.
(2) The core width differs between one end side and the other end side.
(3) The core height and the core width differ between one end side and the other end side.

Here, it is difficult to manufacture the configuration in which the core height differs between one end side and the other end side because of a relationship with a preferred form in manufacturing procedures of the resin optical waveguide.

The preferred form in the manufacturing procedures of the resin optical waveguide is as follows.

An under cladding is formed in a manner that a first curable resin composition is applied on a base member by using a spin coating method, and then the first curable resin composition is cured. Then, a second curable resin composition is applied onto the under cladding by using a spin coating method and thereafter, a core is formed on the under cladding by using a photolithography process. Then, an over cladding is formed in a manner that a third curable resin composition is applied onto the under cladding and the core by using a spin coating method, and then the third curable resin composition is cured. At the time of forming the over cladding, a region having the over cladding and a region in which the core is exposed without the over cladding (i.e., core-exposed portion) can be formed by using a photolithography process.

In the above-mentioned procedures, the second curable resin composition is applied onto the under cladding at a uniform film thickness. Thus, it is difficult to make the core formed by the photolithography process to have a core height differing between one end side and the other end side.

Therefore, the mode (2) among the above-described three options is selected. Thus, the core width on the other end side at which a single-mode optical fiber is connected is smaller than that on one end side at which a silicon optical waveguide is adiabatically coupled.

Factors of causing transmission loss in light propagating in a resin optical waveguide include the presence of foreign substances in the core of the resin optical waveguide or in the vicinity of an interface between the core and the cladding. Representative examples of such foreign substances include bubbles mixed during manufacturing the resin optical waveguide and foreign substances derived from a resin resulting from the curable resin composition used in manufacturing the resin optical waveguide. The bubbles or the foreign substances derived from the resin (they may be simply described as "foreign substances" below in this specification) generate during manufacturing the resin optical waveguide. Thus, the sizes or occurrence frequencies of these foreign substances do not depend on the portions of the resin optical waveguide. The relationship between the transmission loss of light propagating in the resin optical waveguide and the foreign substances is as follows.

(1) As the sizes of the foreign substances existing in the core or in the vicinity of the interface between the core and the cladding become larger, the transmission loss of light propagating in the resin optical waveguide increases.
(2) As the number of the foreign substances existing in the core or in the vicinity of the interface between the core and the cladding become larger, the transmission loss of light propagating in the resin optical waveguide increases.
(3) As the difference between the refractive index of the foreign substances derived from the resin and the refractive index of the core or the cladding of the resin optical waveguide becomes larger, the transmission loss of light propagating in the resin optical waveguide increases.

Therefore, attempts to reduce the sizes of the foreign substances and to reduce the number of the foreign substances in the entirety of the resin optical waveguide have been performed. However, it is difficult to largely reduce the sizes of the foreign substances and largely reduce the number of the foreign substances in the entirety of the resin optical waveguide because manufacturing cost of the resin optical waveguide increases, or the yield of the resin optical waveguide is deteriorated, for example.

Therefore, it is desirable that an influence of the foreign substances on the transmission loss of light propagating in the resin optical waveguide is reduced by the structure and the like of the resin optical waveguide.

To solve the above-described problems in the related art, an object of the present invention is to provide a resin optical waveguide in which transmission loss of light propagating in the resin optical waveguide, which is caused by foreign substances, is reduced by the structure of the resin optical waveguide.

Solution to Problem

To achieve the above-described object, the present inventors have performed intensive studies. As a result, they found that a core size at a portion at which a foreign substance exists also influences a relationship between the transmission loss of light propagating in the resin optical waveguide and the foreign substances, in addition to (1) to (3) described above. Specifically, they found that even in the case where foreign substances having the same size are present, as the core size at a portion at which the foreign substance exists becomes smaller, the transmission loss of light propagating in the resin optical waveguide increases.

The present invention has been made based on the above findings, and provides a resin optical waveguide (1) which includes a core, and an under cladding and an over cladding, which have refractive indices lower than that of the core. The resin optical waveguide has portions having a core width varying along a propagation direction of light. The resin optical waveguide has the maximum core width of 4 µm or more and 10 µm or less, and the minimum core width of 1 µm or more and less than 4 µm. When, in the resin optical waveguide, the length of a portion at which the core width is 1 µm or more and less than 4 µm is denoted by LS (µm), and the length of a portion at which the core width is 4 µm or more and 10 µm or less is denoted by LL (µm), the proportion of LS to the total length (LS+LL) of the resin optical waveguide is from 0.1 to 40%. The portion at which the core width is 1 µm or more and less than 4 µm contains no bubble defect having the maximum diameter of 2 µm or more inside the core and in a vicinity of a core-cladding interface at a distance of 15 µm or less from the center of the core.

The present invention also provides a resin optical waveguide (2) which includes a core, and an under cladding and an over cladding, which have refractive indices lower than that of the core. The resin optical waveguide has portions having a core width varying along a propagation direction of light. The resin optical waveguide has the maximum core width of 4 µm or more and 10 µm or less, and the minimum core width of 1 µm or more and less than 4 µm. When, in the resin optical waveguide, the length of a portion at which the core width is 1 µm or more and less than 4 µm is denoted by LS (µm), and the length of a portion at which the core width is 4 µm or more and 10 µm or less is denoted by LL (µm), the proportion of LS to the total length (LS+LL) of the resin optical waveguide is from 0.1 to 40%. The portion at which the core width is 1 µm or more and less than 4 µm contains no defect having an absolute value of a refractive index difference from a cladding material being 0.03 or more and having the maximum diameter of 8 µm or more inside the core and in a vicinity of a core-cladding interface at a distance of 15 µm or less from the center of the core.

In the resin optical waveguides (1) and (2) according to the present invention, the core width preferably differs between one end side and the other end side of the resin optical waveguide in the propagation direction of light.

In the resin optical waveguides (1) and (2) according to the present invention, it is preferable that the resin optical waveguide has a core-exposed portion on the one end side, at which the over cladding is not provided and the core and the under cladding around the core are exposed, in which the core-exposed portion has a length of 100 µm or more in the propagation direction of light of the resin optical waveguide.

The resin optical waveguides (1) and (2) according to the present invention is preferably single-mode optical waveguides at at least one of a wavelength of 1,310 nm and a wavelength of 1,550 nm.

In the resin optical waveguides (1) and (2) according to the present invention, the core of the resin optical waveguide preferably contains a resin containing fluorine.

Advantageous Effects of Invention

Since the resin optical waveguides (1) and (2) according to the present invention have a specific structure in which core width differs between one end side and the other end side, transmission loss of light propagating in the resin optical waveguide, which is caused by bubbles or foreign substances derived from resin, is reduced. Therefore, they are preferable for the use in a silicon photonics interface in which a silicon optical waveguide and a resin optical waveguide are connected to each other with low loss and at low cost.

BRIEF DESCRIPTION OF DRAWINGS

FIG. 1 is a perspective view illustrating a configuration example of a resin optical waveguide according to the present invention.

FIG. 2 is a view illustrating an end surface of the resin optical waveguide 10 illustrated in FIG. 1, on a core-exposed portion 14 side.

FIG. 3 is a view illustrating an end surface of the resin optical waveguide 10 illustrated in FIG. 1, on a side on which the core-exposed portion is not provided.

FIG. 4 is a perspective view illustrating a configuration example of a composite optical waveguide in which a resin optical waveguide and a silicon optical waveguide are adiabatically coupled.

FIG. 5 is a side view illustrating the composite optical waveguide 100 in FIG. 4.

FIG. 6 is a transverse sectional view illustrating an adiabatic coupling portion of the composite optical waveguide 100 in FIG. 4.

FIG. 7 is a partial enlarged view of FIG. 6.

FIG. 8 is a partial longitudinal sectional view illustrating the adiabatic coupling portion of the composite optical waveguide 100 in FIG. 4.

DESCRIPTION OF EMBODIMENTS

Hereinafter, the present invention will be described with reference to the drawings.

FIG. 1 is a perspective view illustrating a configuration example of a resin optical waveguide according to the present invention. A resin optical waveguide 10 illustrated in FIG. 1 includes a core 11, and an under cladding 12 and an over cladding 13 which have refractive indices lower than that of the core 11. The under cladding 12 is disposed below the core 11. The over cladding 13 is disposed above the core 11. A core-exposed portion 14 in which the over cladding 13 is not provided and the core 11 is exposed is provided on one end side of the resin optical waveguide 10. In the case where the resin optical waveguide 10 illustrated in FIG. 1 is adiabatically coupled with a silicon optical waveguide, the core-exposed portion 14 serves as an adiabatic coupling portion. The other end side of the resin optical waveguide 10 illustrated in FIG. 1, that is, a side on which the core-exposed portion 14 is not provided is used for coupling with a single-mode optical fiber, for example.

In the resin optical waveguide in the present invention, one of the under cladding and the over cladding disposed around the core, which is not provided at the core-exposed portion, is set as the over cladding. Thus, the under cladding may be disposed above the core, and the over cladding may be disposed below the core. The thickness of the under cladding and the over cladding is preferably within a range of from 10 to 200 µm. In the case where the thickness of the under cladding and the over cladding is less than 10 µm, confinement of light into the core may be insufficient. It is preferably 15 µm or more, and more preferably 20 µm or more. In the case where the thickness of the under cladding and the over cladding is more than 200 µm, there is a high possibility of causing warpage in the resin optical waveguide when the resin optical waveguide is manufactured. It is preferably 150 µm or less, and more preferably 200 µm or less.

As will be described later in detail, the core-exposed portion is generally formed by using a photolithography process at the time when the over cladding is formed. In this case, before the core-exposed portion is formed, the over cladding is formed over the total length of the resin optical waveguide. The resin optical waveguide of the present invention also includes that in such a state.

The core is preferably exposed at the adiabatic coupling portion. However, a cladding may be provided so long as the adiabatic coupling due to evanescent light is not disturbed. In this case, the thickness of the cladding at the adiabatic coupling portion is 3 μm or less, preferably 2 μm or less, and more preferably 1 μm or less.

The resin optical waveguide 10 illustrated in FIG. 1 has a core width varying along the propagation direction of light in the resin optical waveguide. Specifically, the core width differs between one end side and the other end side of the resin optical waveguide in the propagation direction of light.

FIG. 2 is a view illustrating an end surface of the resin optical waveguide 10 illustrated in FIG. 1, on the core-exposed portion 14 side. FIG. 3 is a view illustrating an end surface of the resin optical waveguide 10 illustrated in FIG. 1, on a side on which the core-exposed portion is not provided.

As illustrated in FIG. 2, an end surface shape of the core 11 on the core-exposed portion 14 side (one end side) of the resin optical waveguide 10 is a rectangle in which the width of the core 11 is larger than the height of the core 11. As illustrated in FIG. 3 on the other hand, the end surface shape of the core 11 on the side on which the core-exposed portion is not provided (the other end side) of the resin optical waveguide 10, is a substantially square in which the width of the core 11 is smaller than the width of the core 11 on the core-exposed portion 14 side.

In the illustrated resin optical waveguide 10, the end surface on the core-exposed portion 14 side (end surface on the one end side) has the maximum core width, and the end surface on the side on which the core-exposed portion is not provided (end surface on the other end side) has the minimum core width. However, in the resin optical waveguide according to the present invention, a portion having the maximum core width and a portion having the minimum core width may be portions other than the end surfaces of the resin optical waveguide. For example, the portion having the maximum core width or the portion having the minimum core width may exist at an intermediate portion of the resin optical waveguide in the propagation direction of light. In the former case, both end surfaces or one end surface in the propagation direction of light has the minimum core width. In the latter case, both end surfaces or one end surface in the propagation direction of light has the maximum core width.

In the resin optical waveguide 10 in the present invention, the maximum core width in the resin optical waveguide is 4 μm or more and 10 μm or less, and the minimum core width in the resin optical waveguide is 1 μm or more and less than 4 μm.

The reason that the above-mentioned ranges of the maximum core width and the minimum core width of the resin optical waveguide are preferable is as will be described below.

In the case where the maximum core width is set to be 4 μm or more and 10 μm or less, transmission loss of light propagating in the resin optical waveguide, which is caused by foreign substances, can be reduced. In addition, transmission loss caused by warpage can be reduced. In the case where the minimum core width is set to be 1 μm or more and less than 4 μm, connection loss with a single-mode fiber can be suppressed.

In the resin optical waveguide 10 according to the present invention, the maximum core width of the resin optical waveguide is preferably 4.5 μm or more and 9.5 μm or less, and more preferably 5 μm or more and 9 μm or less. The minimum core width of the resin optical waveguide is preferably 1.5 μm or more and 3.5 μm or less, and more preferably 1.8 μm or more and 3 μm or less.

Since the maximum core width and the minimum core width are within the above-mentioned ranges, the resin optical waveguide 10 according to the present invention is divided into a portion (portion S) having a core width of 1 μm or more and less than 4 μm and a portion (portion L) having a core width of 4 μm or more and 10 μm or less. As described above, even in the case where foreign substances having the same size exist, as the core size at a portion at which the foreign substance exists becomes smaller, transmission loss of light propagating in the resin optical waveguide increases. In the case of the resin optical waveguide 10 according to the present invention, if a foreign substance exists at the portion S, transmission loss of light propagating in the resin optical waveguide becomes larger, which lead to a problem.

In the resin optical waveguide 10 according to the present invention, when the length of the portion S is denoted by LS (μm) and the length of the portion L is denoted by LL (μm), the proportion of LS to the total length (LS+LL) of the resin optical waveguide is from 0.1 to 40%. Thus, transmission loss of light propagating in the resin optical waveguide, which is caused by the foreign substance, is reduced. In the case where the proportion of LS to the total length (LS+LL) of the resin optical waveguide is more than 40%, the transmission loss of light propagating in the resin optical waveguide increases due to the foreign substance existing at the portion S. On the other hand, in the case where the proportion of LS to the total length (LS+LL) of the resin optical waveguide is less than 0.1%, the portion S cannot exhibit the required function (e.g., function as a coupling portion with a single-mode optical fiber).

The proportion of LS to the total length (LS+LL) of the resin optical waveguide is preferably from 1 to 35% and more preferably from 5 to 30%.

Transmission loss of light propagating in the resin optical waveguide increases due to the existence of foreign substances in the case where the foreign substances exist on a path in which the light propagates, specifically, in the case where the foreign substances exist inside the core or in the vicinity of the core-cladding interface. In the present specification, in the case of being described as the vicinity of the core-cladding interface, this means the vicinity of the core-cladding interface at a distance of 15 μm or less from the center of the core. This includes the interface between the core and the cladding and the inside of the cladding.

It is necessary that foreign substances having a size as large as transmission loss of light may increase do not exist inside the core or in the vicinity of the core-cladding interface, at the portion S of the resin optical waveguide in the present invention. The size of the foreign substances as large as the transmission loss of light may increase varies depending on the type of the foreign substance.

In the case where the foreign substance is a bubble defect, it is necessary that bubble defects having the maximum diameter of 2 μm or more do not exist inside the core or in the vicinity of the core-cladding interface at the portion S. Preferably, bubble defects having the maximum diameter of 3 μm or more do not exist and more preferably, bubble defects having the maximum diameter of 4 μm or more do not exist inside the core or in the vicinity of the core-cladding interface at the portion S.

In the case where the foreign substance is a foreign substance derived from resin, the refractive index difference between the foreign substance and the cladding material is also affecting. In the case where an absolute value of the refractive index difference between the foreign substance and the cladding material is sufficiently small, there is little possibility of increasing transmission loss of light propagating in the resin optical waveguide even if foreign substances exist in the vicinity of the core-cladding interface. On the other hand, in the case where the absolute value of the refractive index difference between the foreign substance and the cladding material is 0.03 or more, if the foreign substance exists in the vicinity of the core-cladding interface, the transmission loss of light propagating in the resin optical waveguide may increase.

In the case where the foreign substance is a foreign substance derived from resin, it is necessary that foreign substances having the absolute value of the refractive index difference from the cladding material being 0.03 or more and having the maximum diameter of 8 µm or more do not exist in the vicinity of the core-cladding interface of the portion S. The reason of setting the refractive index difference from the cladding material as a determination index is because foreign substances derived from resin exist in a cladding region in many cases.

Preferably, foreign substances having the absolute value of the refractive index difference from the cladding material being 0.03 or more and having the maximum diameter of 9 µm or more do not exist, and more preferably, foreign substances having the absolute value of the refractive index difference from the cladding material being 0.03 or more and having the maximum diameter of 10 µm or more do not exist, in the vicinity of the core-cladding interface of the portion S.

The resin optical waveguide according to the present invention will be more described.

(Core 11)

In the illustrated resin optical waveguide 10, the width of the core 11 on one end side (core-exposed portion 14 side) is large, and the width of the core 11 on the other end side (side on which the core-exposed portion is not provided) is small. The resin optical waveguide according to the present invention should have portions having a core width varying along the propagation direction of light in the resin optical waveguide, but the end surface shape of the core is not limited to the illustrated rectangle or a substantial square. The end surface shape of the core (cross-sectional shape of the core 11 inside the resin optical waveguide 10) may be trapezoidal, circular, or elliptical, for example. In the case where the end surface shape of the core is a polygon such as a rectangle, substantial square or trapezoid, the corners thereof may be rounded.

As described above, in the adiabatic coupling portion, without reducing the core height of the core 11 to a certain level, spreading in a propagation mode does not occur largely and it becomes impossible to make light propagate in the silicon optical waveguide. Therefore, about 4 µm is set as an upper limit of the core height. The core height is preferably from 1 to 3 µm, and is more preferably from 1.5 to 2.5 µm.

In the resin optical waveguide 10 illustrated in FIGS. 1 to 3, one core is provided. However, the number of cores in the resin optical waveguide is not limited to this. As with the cores 220 in the resin optical waveguide 200 illustrated in FIGS. 4 and 6, a plurality of cores may be provided in one direction to have an array shape. In this case, as with the cores 220 of the resin optical waveguide 200 illustrated in FIG. 4, a bending region may be provided in order to widen a spacing between the cores. Preferably, the bending region is a portion (portion L) having a core width of 4 µm or more and 10 µm or less.

As described above, the resin optical waveguide 10 illustrated in FIGS. 1 to 3 includes the core 11, and the under cladding 12 and the over cladding 13 having refractive indices which are lower than that of the core 11. The present invention is not particularly limited so long as this condition is satisfied, and the core 11 may have refractive index distribution in the inside thereof. In this case, the refractive index distribution in which the refractive index decreases outward from the center of the core may be provided. In addition, the refractive index distribution in which the refractive index on the over cladding side becomes high and the refractive index on the under cladding side becomes low may be provided. In addition, the refractive index distribution in which the refractive index on the over cladding side becomes low and the refractive index on the under cladding side becomes high may be provided.

(Under Cladding 12 and Over Cladding 13)

The under cladding 12 and the over cladding 13 may have a simple refractive index. Alternatively, portions having different refractive indices on a near side and a far side to the core 11 may be provided. In this case, a configuration in which the refractive index decreases outward from the core 11 may be made, or a configuration in which the refractive index increases outward from the core 11 may be made.

The thickness of the under cladding 12 and the over cladding 13 is not particularly limited. In the case where the resin optical waveguide 10 according to the present invention is a single-mode optical waveguide, propagating light also leaks at the cladding portion in a range of about 10 µm from the center of the core 11. Thus, from a viewpoint of reducing propagation loss of light, the thickness thereof is preferably 10 µm or more. The total thickness of the under cladding 12 and the over cladding 13 is preferably, from 20 to 100 µm, and more preferably from 30 to 80 µm.

The core-exposed portion 14 of the resin optical waveguide 10 illustrated in FIG. 1 serves as a coupling portion with a silicon optical waveguide when the resin optical waveguide 10 is used in a silicon photonics interface. Therefore, the core-exposed portion 14 is required to have a length enough for being used as the coupling portion with a silicon optical waveguide. Specifically, the length of the core-exposed portion 14 of the resin optical waveguide in the propagation direction of light is preferably 100 µm or more, more preferably 300 µm or more, further preferably 500 µm or more, and particularly preferably 1,000 µm or more.

However, if the length of the core-exposed portion 14 of the resin optical waveguide in the propagation direction of light is too long, when it is connected to a silicon optical waveguide by using an adhesion (e.g., epoxy resin), connection loss may increase due to absorption by the adhesive layer. Therefore, the length of the core-exposed portion 14 of the resin optical waveguide in the propagation direction of light is preferably 10,000 µm or less, more preferably 5,000 µm or less, and further preferably 3,000 µm or less.

In the resin optical waveguide according to the present invention, constituent materials of the core 11, under cladding 12 and over cladding 13 are not particularly limited so long as they satisfy characteristics required as the resin optical waveguide. The constituent material of the core 11 is preferably a resin including fluorine from a viewpoint of suppressing loss of light propagating in the core 11.

Regarding the constituent materials of the core 11, under cladding 12 and over cladding 13 and the manufacturing procedures of the resin optical waveguide, the descriptions in the following documents can be used as a reference.
WO 2010/107005
JP-A 2013-120338
JP-A 2012-63620

In the case of manufacturing the resin optical waveguide 10 according to the present invention, illustrated in FIG. 1, with reference to the above documents, the core-exposed portion 14 of the resin optical waveguide 10 can be formed by procedures as follows.

A first curable resin composition is applied on a base member by using a spin coating method and then the first curable resin composition is cured, to thereby form an under cladding. Then, a second curable resin composition is applied onto the under cladding by using a spin coating method and thereafter, a core is formed on the under cladding by using a photolithography process. Subsequently, a third curable resin composition is applied onto the under cladding and the core by using a spin coating method and then the third curable resin composition is cured, to thereby form an over cladding. At the time of forming the over cladding, a region having the over cladding and a region in which the core is exposed without the over cladding (i.e., core-exposed portion) can be formed by using a photolithography process.

As described above, the resin optical waveguide according to the present invention has portions having a core width varying along the propagation direction of light in the resin optical waveguide. In order to form the portions having a core width varying along the propagation direction of light in the resin optical waveguide, the following procedures may be performed when the resin optical waveguide is manufactured in accordance with the above-described procedures.

The core is formed by performing a lithographic exposure with a photomask having a shape in which the core width varies along the propagation direction of light, followed by developing. Thereafter, post-baking is performed if necessary.

In the resin optical waveguide according to the present invention, it is necessary that foreign substances having a size as large as transmission loss of light may increase do not exist inside the core or in the vicinity of the core-cladding interface, at the portion S having a core width of 1 μm or more and less than 4 μm.

In the case where the foreign substance is a bubble defect, it is necessary that bubble defects having the maximum diameter of 2 μm or more do not exist inside the core or in the vicinity of the core-cladding interface at the portion S. In the case where the foreign substance is a foreign substance derived from resin, it is necessary that foreign substances having an absolute value of the refractive index difference from the cladding material being 0.03 or more and having the maximum diameter of 8 μm or more do not exist in the vicinity of the core-cladding interface of the portion S.

In order to manufacture a resin optical waveguide in which the above-described bubble defects do not exist inside the core or in the vicinity of the core-cladding interface at the portion S, it is desirable that the curable resin compositions are allowed to sufficiently stay to defoam before coating is performed. Alternatively, defoaming is desirably performed with a defoaming device.

In order to manufacture a resin optical waveguide in which the above-described foreign substances derived from foreign substances do not exist in the vicinity of the core-cladding interface at the portion S, the following procedures may be performed. The curable resin compositions are filtrated to remove foreign substances in the compositions and the base member is washed to remove foreign substances on the surface of the base member, before the coating. In order to prevent adhering of foreign substances in air, these operations are desirably performed in a clean room. In order to prevent adhering of foreign substance due to static electricity, the use of an electrostatic remover (ionizer) is further desirably.

The resin optical waveguide according to the present invention is used in a silicon photonics interface in which a silicon optical waveguide and the resin optical waveguide are connected to each other with low loss and at low cost. Thus, the resin optical waveguide is preferably a single-mode optical waveguide because optical signal propagating in the single-mode optical waveguide can be highly densified. In this case, it is preferably a single-mode optical waveguide at at least one of the wavelengths of 1,310 nm and 1,550 nm from a point that light can be made to propagate in a silicon optical waveguide or a single-mode optical fiber at low loss.

In the case where the resin optical waveguide according to the present invention is used in a silicon photonics interface, the resin optical waveguide is connected to a silicon optical waveguide at the core-exposed portion thereof.

EXAMPLES

The present invention will be more specifically described below by using Examples. However, the present invention is not limited to these Examples.

In Examples which will be described below, the structure (size and refractive index) of a resin optical waveguide was defined by RSoft CAD manufactured by RSoft Design Group Inc., and simulation of light propagation was performed by BeamProp (finite difference beam propagation method) that is a simulation engine manufactured by RSoft Design Group Inc.

(Simulation Analysis 1 of Transmission Loss due to Bubble Defect)

Resin optical waveguides (core height was constant) having structures in which the core height is 2.0 μm and the core width is different in five types of 2.0 μm, 3.0 μm, 4.0 μm, 6.0 μm, and 8.0 μm were defined. The simulation analysis was performed for the relationship of transmission loss of light having a wavelength of 1,310 nm, on the assumption that spherical bubble defects having the maximum diameter (side view) of from 1.0 to 2.5 μm exist at the core-cladding interface of the resin optical waveguide. Conditions used in the simulation analysis except for that described above are as follows.

(Resin Optical Waveguide)
Propagation mode: single-mode
Core height: 2.0 μm
Core width: 2.0 μm, 3.0 μm, 4.0 μm, 6.0 μm, 8.0 μm
Core cross-sectional shape: rectangle (square in the case of the core width of 2.0 μm)
Core refractive index: 1.526
Cladding thickness: 80 μm
Cladding refractive index: 1.513
Bubble-defect refractive index: 1.00
Bubble defect shape: sphere
Bubble size (maximum diameter): 1.0 μm, 1.5 μm, 2.0 μm, 2.5 μm Results are shown in the following tables. In the tables, A-1, A-2, A-5, A-6, and A-9 to A-20 correspond to Examples, and A-3, A-4, A-7, and A-8 correspond to Comparative Examples.

TABLE 1

|  | A-1 | A-2 | A-3 | A-4 | A-5 | A-6 | A-7 | A-8 |
|---|---|---|---|---|---|---|---|---|
| Core width (µm) | 2.0 | 2.0 | 2.0 | 2.0 | 3.0 | 3.0 | 3.0 | 3.0 |
| Bubble size (µm) | 1.0 | 1.5 | 2.0 | 2.5 | 1.0 | 1.5 | 2.0 | 2.5 |
| Loss (dB) | 0.11 | 0.36 | 0.62 | 0.73 | 0.09 | 0.28 | 0.46 | 0.53 |

TABLE 2

|  | A-9 | A-10 | A-11 | A-12 | A-13 | A-14 | A-15 | A-16 |
|---|---|---|---|---|---|---|---|---|
| Core width (µm) | 4.0 | 4.0 | 4.0 | 4.0 | 6.0 | 6.0 | 6.0 | 6.0 |
| Bubble size (µm) | 1.0 | 1.5 | 2.0 | 2.5 | 1.0 | 1.5 | 2.0 | 2.5 |
| Loss (dB) | 0.06 | 0.19 | 0.31 | 0.34 | 0.03 | 0.09 | 0.14 | 0.16 |

TABLE 3

|  | A-17 | A-18 | A-19 | A-20 |
|---|---|---|---|---|
| Core width (µm) | 8.0 | 8.0 | 8.0 | 8.0 |
| Bubble size (µm) | 1.0 | 1.5 | 2.0 | 2.5 |
| Loss (dB) | 0.02 | 0.05 | 0.07 | 0.08 |

As is apparent from the tables, in A-3, A-4, A-7, and A-8 in which bubble defects having the maximum diameter of 2 µm or larger exist at the portion having a core width of 1 µm or more and less than 4 µm, transmission loss was as large as 0.45 dB or greater. On the contrary, in A-1, A-2, A-5, and A-6 in which bubble defects having the maximum diameter of smaller than 2 µm exist at the portion having a core width of 1 µm or more and less than 4 µm, the transmission loss was as small as smaller than 0.45 dB. In addition, in A-9 to A-20 in which the core width of the portion at which bubble defects exist is 4 µm or more, the transmission loss was as small as smaller than 0.45 dB, in any of cases where the maximum diameter of the bubble defects is smaller than 2 µm and is 2 µm or larger.

(Simulation Analysis 1 of Transmission Loss due to Resin-derived Foreign Substance)

Resin optical waveguides having structures in which the core height is 2.0 µm and the core width is different in four types of 2.0 µm, 3.0 µm, 4.0 µm, and 6.0 µm were defined. The simulation analysis was performed for the relationship of transmission loss of light having a wavelength of 1,310 nm, on the assumption that resin-derived foreign substances which have two types of the maximum diameter (side view) of 4.0 µm and 8.0 µm, and seven types of refractive index difference ((refractive index of resin-derived foreign substance)-(refractive index of cladding material)) Dn from the cladding material of −0.03, −0.02, −0.01, 0, 0.01, 0.02, and 0.03, and have a cubic shape, exist at the core-cladding interface of the resin optical waveguide. Conditions used in the simulation analysis except for that described above are as follows.

(Resin Optical Waveguide)
Propagation mode: single-mode
Core height: 2.0 µm
Core width: 2.0 µm, 3.0 µm, 4.0 µm, 6.0 µm
Core cross-sectional shape: rectangle (square in the case of the core width of 2 µm)
Core refractive index: 1.526
Cladding thickness: 80 µm
Cladding refractive index: 1.513
Refractive index difference ((refractive index of resin-derived foreign substance)—(refractive index of cladding material)) Dn: −0.03, −0.02, −0.01, 0, 0.01, 0.02, and 0.03
Resin-derived foreign substance shape: rectangular parallelepiped
Foreign substance size (side view, maximum diameter): 4.0 µm, 8.0 µm Results are shown in the following tables. In the tables, B-1 to B-7, B-9 to B-13, B-15 to B-21, B-23 to B-27, and B-29 to B-56 correspond to Examples, and B-8, B-14, B-22, and B-28 correspond to Comparative Examples.

TABLE 4

|  | B-1 | B-2 | B-3 | B-4 | B-5 | B-6 | B-7 |
|---|---|---|---|---|---|---|---|
| Core width (µm) | 2.0 | 2.0 | 2.0 | 2.0 | 2.0 | 2.0 | 2.0 |
| Foreign substrate size (µm) | 4.0 | 4.0 | 4.0 | 4.0 | 4.0 | 4.0 | 4.0 |
| Refractive index difference Dn | −0.03 | −0.02 | −0.01 | 0 | 0.01 | 0.02 | 0.03 |
| Loss (dB) | 0.16 | 0.07 | 0.02 | 0.00 | 0.02 | 0.08 | 0.17 |

TABLE 5

|  | B-8 | B-9 | B-10 | B-11 | B-12 | B-13 | B-14 |
|---|---|---|---|---|---|---|---|
| Core width (µm) | 2.0 | 2.0 | 2.0 | 2.0 | 2.0 | 2.0 | 2.0 |
| Foreign substrate size (µm) | 8.0 | 8.0 | 8.0 | 8.0 | 8.0 | 8.0 | 8.0 |
| Refractive index difference Dn | −0.03 | −0.02 | −0.01 | 0 | 0.01 | 0.02 | 0.03 |
| Loss (dB) | 0.84 | 0.39 | 0.10 | 0.00 | 0.10 | 0.42 | 0.96 |

TABLE 6

|  | B-15 | B-16 | B-17 | B-18 | B-19 | B-20 | B-21 |
|---|---|---|---|---|---|---|---|
| Core width (µm) | 3.0 | 3.0 | 3.0 | 3.0 | 3.0 | 3.0 | 3.0 |
| Foreign substrate size (µm) | 4.0 | 4.0 | 4.0 | 4.0 | 4.0 | 4.0 | 4.0 |
| Refractive index difference Dn | −0.03 | −0.02 | −0.01 | 0 | 0.01 | 0.02 | 0.03 |
| Loss (dB) | 0.11 | 0.05 | 0.01 | 0.00 | 0.01 | 0.06 | 0.13 |

TABLE 7

|  | B-22 | B-23 | B-24 | B-25 | B-26 | B-27 | B-28 |
|---|---|---|---|---|---|---|---|
| Core width (µm) | 3.0 | 3.0 | 3.0 | 3.0 | 3.0 | 3.0 | 3.0 |
| Foreign substrate size (µm) | 8.0 | 8.0 | 8.0 | 8.0 | 8.0 | 8.0 | 8.0 |
| Refractive index difference Dn | −0.03 | −0.02 | −0.01 | 0 | 0.01 | 0.02 | 0.03 |
| Loss (dB) | 0.53 | 0.25 | 0.07 | 0.00 | 0.07 | 0.28 | 0.65 |

TABLE 8

|  | B-29 | B-30 | B-31 | B-32 | B-33 | B-34 | B-35 |
|---|---|---|---|---|---|---|---|
| Core width (µm) | 4.0 | 4.0 | 4.0 | 4.0 | 4.0 | 4.0 | 4.0 |
| Foreign substrate size (µm) | 4.0 | 4.0 | 4.0 | 4.0 | 4.0 | 4.0 | 4.0 |
| Refractive index difference Dn | −0.03 | −0.02 | −0.01 | 0 | 0.01 | 0.02 | 0.03 |
| Loss (dB) | 0.08 | 0.03 | 0.01 | 0.00 | 0.01 | 0.04 | 0.08 |

TABLE 9

|  | B-36 | B-37 | B-38 | B-39 | B-40 | B-41 | B-42 |
|---|---|---|---|---|---|---|---|
| Core width (μm) | 4.0 | 4.0 | 4.0 | 4.0 | 4.0 | 4.0 | 4.0 |
| Foreign substrate size (μm) | 8.0 | 8.0 | 8.0 | 8.0 | 8.0 | 8.0 | 8.0 |
| Refractive index difference Dn | −0.03 | −0.02 | −0.01 | 0 | 0.01 | 0.02 | 0.03 |
| Loss (dB) | 0.33 | 0.16 | 0.04 | 0.00 | 0.05 | 0.18 | 0.42 |

TABLE 10

|  | B-43 | B-44 | B-45 | B-46 | B-47 | B-48 | B-49 |
|---|---|---|---|---|---|---|---|
| Core width (μm) | 6.0 | 6.0 | 6.0 | 6.0 | 6.0 | 6.0 | 6.0 |
| Foreign substrate size (μm) | 4.0 | 4.0 | 4.0 | 4.0 | 4.0 | 4.0 | 4.0 |
| Refractive index difference Dn | −0.03 | −0.02 | −0.01 | 0 | 0.01 | 0.02 | 0.03 |
| Loss (dB) | 0.04 | 0.02 | 0.00 | 0.00 | 0.00 | 0.02 | 0.04 |

TABLE 11

|  | B-50 | B-51 | B-52 | B-53 | B-54 | B-55 | B-56 |
|---|---|---|---|---|---|---|---|
| Core width (μm) | 6.0 | 6.0 | 6.0 | 6.0 | 6.0 | 6.0 | 6.0 |
| Foreign substrate size (μm) | 8.0 | 8.0 | 8.0 | 8.0 | 8.0 | 8.0 | 8.0 |
| Refractive index difference Dn | −0.03 | −0.02 | −0.01 | 0 | 0.01 | 0.02 | 0.03 |
| Loss (dB) | 0.15 | 0.07 | 0.02 | 0.00 | 0.02 | 0.09 | 0.19 |

As is apparent from the tables, in B-8, B-14, B-22, and B-28 in which resin-derived foreign substances having the maximum diameter of 8 μm or larger and having the absolute value of the refractive index difference from the cladding material being 0.03 or more exist at the portion having a core width of 1 μm or more and less than 4 transmission loss was as large as 0.45 dB or greater. On the contrary, in B-1 to B-7, B-9 to B-13, B-15 to B-21, and B-23 to B-27 in which the maximum diameter of the resin-derived foreign substances existing at the portion having a core width of 1 μm or more and less than 4 μm is less than 8 μm, or the absolute value of the refractive index difference from the cladding material is less than 0.03, the transmission loss was as small as smaller than 0.45 dB. In addition, in B-29 to B-56 in which the core width of the portion at which resin-derived foreign substances exist is 4 μm or more, the transmission loss was as small as smaller than 0.45 dB, in any of cases where the maximum diameter of the resin-derived foreign substances is smaller than 8 μm and is 8 μm or larger, and cases where the absolute value of the refractive index difference from the cladding material is 0.03 or less and is 0.03 or more.

(Simulation Analysis 2 of Transmission Loss due to Bubble Defect)

Resin optical waveguides having structures in which the core height is 2.0 μm and the core width differs between one end side and the other end side (the core width on the one end side is 1 μm or more and less than 4 μm, and the core width on the other end side is 4 μm or more and 10 μm or less) were defined. The simulation analysis was performed for the relationship of transmission loss of light having a wavelength of 1,310 nm, on the assumption that spherical bubble defects having the maximum diameter (side view) of 1.0 to 2.5 μm exist at the core-cladding interface of the resin optical waveguide. Conditions used in the simulation analysis except for that described above are as follows.

(Resin Optical Waveguide)
Propagation mode: single-mode
Core height: 2.0 μm
Core width (one end side): 2.0 μm, 3.0 μm
Core cross-sectional shape: rectangle (square in the case of the core width of 2.0 μm)
Core width (the other end side): 6.0 μm, 8.0 μm
Core cross-sectional shape: rectangle
Length LS of portion S: 50 μm, 200 μm, 300 μm, 600 μm
Length LL of portion L: 400 μm, 600 μm, 1,000 μm, 1,200 μm
Core refractive index: 1.526
Cladding thickness: 80 μm
Cladding refractive index: 1.513
Bubble-defect refractive index: 1.00
Bubble defect shape: sphere
Bubble size (maximum diameter): 1.0 μm, 1.5 μm, 2.5 μm Results are shown in the following tables. In the tables, C-1, C-3, C-5, and C-6 correspond to Examples, and C-2, C-4 and C-7 correspond to Comparative Examples.

TABLE 12

|  | C-1 | C-2 | C-3 | C-4 | C-5 | C-6 | C-7 |
|---|---|---|---|---|---|---|---|
| Length LS (μm) | 50 | 50 | 200 | 200 | 300 | 300 | 600 |
| Core width (μm) at position at which defect exits | No defect (2.0) | 2.0 | No defect (3.0) | 3.0 | 2.0 | 3.0 | 3.0 |
| Bubble size (μm) | No defect | 2.5 | No defect | 2.5 | 1.5 | 1.0 | 2.5 |
| Length LL (μm) | 1,200 | 1,200 | 1,000 | 1,200 | 600 | 600 | 400 |
| Core width (μm) at position at which defect exists | 6.0 | No defect (6.0) | 8.0 | No defect (8.0) | No defect (8.0) | 8.0 | 8.0 |
| Bubble size (μm) | 2.5 | No defect | 2.0 | No defect | No defect | 1.5 | 1.5 |
| Proportion (%) of length LS | 4.0 | 4.0 | 16.7 | 14.3 | 33.3 | 33.3 | 60.0 |
| Loss (dB) | 0.16 | 0.73 | 0.07 | 0.53 | 0.36 | 0.14 | 0.57 |

As is apparent from the tables, in C-2, C-4 and C-7 in which bubble defects having the maximum diameter of 2 μm or more exist at the portion S having a core width of 1 μm or more and less than 4 μm, transmission loss was as large as 0.45 dB or greater. On the contrary, in C-1, C-3, C-5, and C-6 in which bubble defects do not exist at the portion S having a core width of 1 μm or more and less than 4 μm, or the bubble defects have the maximum diameter of less than 2 μm, the transmission loss was as small as smaller than 0.45 dB, in any of the case where bubble defects do not exist at the portion L having a core width which of 4 μm or more and 10 μm or less, the case where bubble defects having the maximum diameter of less than 2 μm exist, and the case where bubble defects having the maximum diameter of 2 μm or more exist.

Cladding thickness: 80 μm
Cladding refractive index: 1.513
Refractive index difference ((refractive index of resin-derived foreign substance)—(refractive index of cladding material)) Dn: −0.03, −0.02, 0.01, 0.02, and 0.03
Resin-derived foreign substance shape: rectangular parallelepiped
Foreign substance size (side view, maximum diameter): 4.0 μm, 8.0 μm Results are shown in the following tables. In the tables, D-1, D-3, D-5, and D-6 correspond to Examples, and D-2, D-4, and D-7 correspond to Comparative Examples.

TABLE 13

|  | D-1 | D-2 | D-3 | D-4 | D-5 | D-6 | D-7 |
|---|---|---|---|---|---|---|---|
| Length LS (μm) | 50 | 50 | 200 | 200 | 300 | 300 | 600 |
| Core width (μm) at position at which defect exists | No defect (2.0) | 2.0 | No defect (3.0) | 3.0 | 2.0 | 2.0 | 2.0 |
| Foreign substance size (μm) | No defect | 8.0 | No defect | 8.0 | 4.0 | 8.0 | 8.0 |
| Refractive index different Dn | No defect | 0.03 | No defect | 0.03 | 0.01 | 0.01 | −0.03 |
| Length LL (μm) | 1,200 | 1,200 | 1,000 | 1,200 | 600 | 600 | 400 |
| Core width (μm) at position at which defect exists | 6.0 | No defect (6.0) | 6.0 | No defect (6.0) | No defect (6.0) | 6.0 | 6.0 |
| Foreign substance size (μm) | 8.0 | No defect | 8.0 | No defect | No defect | 8.0 | 8.0 |
| Refractive index different Dn | 0.02 | No defect | −0.02 | No defect | No defect | 0.01 | 0.01 |
| Proportion (%) of length LS | 4.0 | 4.0 | 16.7 | 14.3 | 33.3 | 33.3 | 60.0 |
| Loss (dB) | 0.09 | 0.96 | 0.07 | 0.65 | 0.02 | 0.12 | 0.87 |

(Simulation Analysis 2 of Transmission Loss due to Resin-derived Foreign Substance)

Resin optical waveguides having structures in which the core height is 2.0 μm and the core width differs between one end side and the other end side (the core width on the one end side is 1 μm or more and less than 4 μm, and the core width on the other end side is 4 μm or more and 10 μm or less) were defined. The simulation analysis was performed for the relationship of transmission loss of light having a wavelength of 1,310 nm, on the assumption that resin-derived foreign substances which have two types of the maximum diameter (side view) of 4.0 μm and 8.0 μm, and refractive index differences ((refractive index of resin-derived foreign substance)-(refractive index of cladding material)) Dn from the cladding material of −0.03, −0.02, 0.01, 0.02, and 0.03, and have a cubic shape exist at the core-cladding interface of the resin optical waveguide. Conditions used in the simulation analysis except for that described above are as follows.

(Resin Optical Waveguide)
Propagation mode: single-mode
Core height: 2.0 μm
Core width (one end side): 2.0 μm, 3.0 μm
Core cross-sectional shape: rectangle (square in the case of the core width of 2.0 μm)
Core width (the other end side): 6.0 μm
Core cross-sectional shape: rectangle
Length LS of portion S: 50 μm, 200 μm, 300 μm, 600 μm
Length LL of portion L: 400 μm, 600 μm, 1,000 μm, 1,200 μm
Core refractive index: 1.526

As is apparent from the tables, in D-2, D-4 and D-7 in which resin-derived foreign substances having the maximum diameter of 8 μm or more and having the absolute value of the refractive index difference from the cladding material being 0.03 or more exist at the portion S having a core width of 1 μm or more and less than 4 μm, transmission loss was as large as 0.45 dB or greater. On the contrary, in D-1, D-3, D-5, and D-6 in which resin-derived foreign substances do not exist at the portion S having a core width of 1 μm or more and less than 4 μm, the maximum diameter of the resin-derived foreign substances is less than 8 μm, or the absolute value of the refractive index difference from the cladding material is less than 0.03, the transmission loss was as small as smaller than 0.45 dB, in any of the case where resin-derived foreign substances do not exist at the portion L having a core width of 4 μm or more and 10 μm or less, and the case where resin-derived foreign substances having the maximum diameter of 8 μm or more exist.

The present invention is described in detail with reference to specific embodiments, but it is apparent for those skilled in the art that various changes or modifications can be added without departing from the spirit and the scope of the present invention. This application is based upon Japanese Patent Application (No. 2016-110903), filed on Jun. 2, 2016, the contents of which are incorporated herein by reference.

REFERENCE SIGNS LIST

10: resin optical waveguide
11: core
12: under cladding

13: over cladding
14: core-exposed portion
100: composite optical waveguide
200: resin optical waveguide
210: cladding
220: core
300: silicon optical waveguide
310: cladding
320: core
400: connector
500: adhesive layer
700: adiabatic coupling portion

The invention claimed is:

1. A resin optical waveguide, comprising a core, and an under cladding and an over cladding, both of which have refractive indices lower than that of the core,
wherein
the resin optical waveguide has portions having a core width varying along a propagation direction of light,
the resin optical waveguide has a maximum core width of 4 µm or more and 10 µm or less, and a minimum core width of 1 µm or more and less than 4 µm,
a proportion of LS to a total of LS and LL as expressed by LS/(LS+LL) is from 0.1 to 40%, where LS is a length of a portion at which the core width is 1 µm or more and less than 4 µm and LL is a length of a portion at which the core width is 4 µm or more and 10 µm or less,
the portion at which the core width is 1 µm or more and less than 4 µm comprises no bubble defect having a maximum diameter of 2 µm or more either inside the core or in a vicinity of a core-cladding interface at a distance of 15 µm or less from the center of the core,
the resin optical waveguide has a core-exposed portion on one end side, at which the over cladding is not provided and the core and the under cladding around the core are exposed, and
the core-exposed portion has a length of 100 µm or more in the propagation direction of light of the resin optical waveguide.

2. The resin optical waveguide according to claim 1, wherein the core width differs between one end side and the other end side of the resin optical waveguide in the propagation direction of light.

3. The resin optical waveguide according to claim 1, which is a single-mode optical waveguide at at least one of a wavelength of 1,310 nm and a wavelength of 1,550 nm.

4. The resin optical waveguide according to claim 1, wherein the core of the resin optical waveguide comprises a resin comprising fluorine.

5. The resin optical waveguide according to claim 1, wherein the under cladding and the over cladding have a thickness of 10 to 200 µm.

6. The resin optical waveguide according to claim 1, wherein the core has a height of 1 to 3 µm.

7. A resin optical waveguide, comprising a core, and an under cladding and an over cladding, both of which have refractive indices lower than that of the core,
wherein
the resin optical waveguide has portions having a core width varying along a propagation direction of light,
the resin optical waveguide has a maximum core width of 4 µm or more and 10 µm or less, and a minimum core width of 1 µm or more and less than 4 µm,
a proportion of LS to a total of LS and LL as expressed by LS/(LS+LL) is from 0.1 to 40%, where LS is a length of a portion at which the core width is 1 µm or more and less than 4 µm and LL is a length of a portion at which the core width is 4 µm or more and 10 µm or less,
the portion at which the core width is 1 µm or more and less than 4 µm comprises no defect, which has an absolute value of a refractive index difference from a cladding material being 0.03 or more and a maximum diameter of 8 µm or more, either inside the core or in a vicinity of a core-cladding interface at a distance of 15 µm or less from the center of the core,
the resin optical waveguide has a core-exposed portion on one end side, at which the over cladding is not provided and the core and the under cladding around the core are exposed, and
the core-exposed portion has a length of 100 µm or more in the propagation direction of light of the resin optical waveguide.

8. The resin optical waveguide according to claim 7, wherein the core width differs between one end side and the other end side of the resin optical waveguide in the propagation direction of light.

9. The resin optical waveguide according to claim 7, which is a single-mode optical waveguide at least one of a wavelength of 1,310 nm and a wavelength of 1,550 nm.

10. The resin optical waveguide according to claim 7, wherein the core of the resin optical waveguide comprises a resin comprising fluorine.

11. The resin optical waveguide according to claim 7, wherein the under cladding and the over cladding have a thickness of 10 to 200 µm.

12. The resin optical waveguide according to claim 7, wherein the core has a height of 1 to 3 µm.

* * * * *